United States Patent Office 3,210,258
Patented Oct. 5, 1965

3,210,258
EXTRACTION OF STREPTOKINASE AND STREPTODORNASE WITH UREA
Ralph Edward Clarke, Rivervale, N.J., and Samuel Richard Hawkins, Pearl River, N.Y., assignors to American Cyanamid Company, Stamford, Conn., a corporation of Maine
No Drawing. Filed Nov. 22, 1963, Ser. No. 325,758
3 Claims. (Cl. 195—66)

This invention relates to the recovery of streptokinase and streptodornase from fermentation harvest mashes containing the same and more particularly is concerned with an improved process for recovering crude streptokinase-streptodornase from such fermentation beers involving the use of urea as an extractant.

Streptokinase is well known as an enzyme elaborated by certain trains of beta-hemolytic streptococci, especially those of Group A and Lancefield Group C streptococci. The production of streptokinase by fermentation of these organisms is accompanied by the formation of various other metabolic by-products including substantial amounts of streptodornase and lesser amounts of numerous other substances and impurities, some of which have been identified as hyaluronidase, streptolysin, diphosphopyridine nucleotidase, etc. Several means of processing fermentation beers to effect the recovery therefrom of streptokinase and streptodornase, associated to some extent with other extraneous substances, have been described in the patented art.

Combinations of streptokinase and streptodornase have been in use for some years for the liquefaction of fibrinous and purulent accumulations in the treatment of suppurative surface tissues, infected wounds and burns, chronic suppurations and the like. For this reason, commercial processes for the refining of streptokinase-streptodornase ferments have been directed to the recovery and purification of streptokinase-streptodornase mixtures. See, for example, Ablondi and Nalesnyk, United States Patent No. 2,677,642; Ablondi and Nalesnyk, United States Patent No. 2,677,643; Ablondi and Querry, United States Patent No. 2,691,620; Ablondi and Adams, United States Patent No. 2,701,227; Hawkins, United States Patent No. 2,702,781; and Ablondi and Mills, United States Patent No. 2,784,145. The commercial streptokinase-streptodornase mixture prepared in accordance with the teachings of these patents has been available commercially as a mixture assaying about 80 streptokinase units per gamma of nitrogen and about 20 streptodornase units per gamma of nitrogen.

The present invention is concerned with an improved process of isolating streptokinase-streptodornase from fermentation beers in a manner whereby increased recovery of streptokinase-streptodornase is obtained while at the same time the amounts of various other principals referred to above are minimized.

In accordance with the present invention we have discovered that this desirable result can be accomplished by the use of urea in the extraction process. Upon completion of the fermentation the organisms contained in the fermentation liquor are killed immediately with hexylresorcinol, and the pH is adjusted to pH 3.0. The dead organisms and enzymes are precipitated together and allowed to settle and a portion of the clear supernatant is siphoned off and discarded. The remainder of the tank is then centrifuged and the resultant precipitate is resuspended in a distilled water solution of urea of from one to five molarity and preferably three molar to approximately 10% of the volume of the original fermentation liquor. The suspension is then adjusted to pH 7.8 with sodium hydroxide. This suspension is then centrifuged and the precipitate discarded as the supernatant contains the active enzymes. The process of extraction is thereafter carried out in a conventional manner as described in Example 1 below. The use of urea in the extraction step results in an overall increase in recovery of streptokinase-streptodornase of the order of 40–50%.

The invention will be described in greater detail in conjunction with the following specific examples.

EXAMPLE 1

Upon completion of the fermentation of streptokinase-streptodornase containing mash, the organisms contained in the fermentation liquor are killed with 1:10,000 concentration of hexylresorcinol. The liquor is adjusted to pH 3.0 with hydrochloric acid. The dead organisms and enzymes are precipitated together and allowed to settle. After an appropriate interval, about 25–35 % of the clear supernatant is siphoned off and discarded. The remainder of the tank contents is then centrifuged and the resultant precipitate resuspended in a distilled water solution of three molar urea to approximately 10% of the volume of the original fermentation liquor. The reaction is then adjusted with sodium hydroxide to pH 7.8. This suspension is then centrifuged and the precipitate discarded, since the supernatant contains the active enzymes. This supernatant is brought to a concentration of 40% in cold ethanol in the presence of 0.05 M $CaCl_2$ and 2.0 grams of cholesterol per liter of ethanol added. After an appropriate settling period in the chillroom, the precipitated cake is collected by centrifugation. This cake is slurried in water at pH 8.0 in the presence of 0.05 M $CaCl_2$ and protamine sulfate added in sufficient amount to effect precipitation. The precipitate formed is composed of undesirable proteins while the supernatant contains the active enzymes in somewhat purified form. The supernatant is collected by centrifugation and adjusted to pH 5.3 with HCl, acetate buffer is added and ethanol added to a concentration of 40% in the cold (−50° C. to −10.0° C.). The precipitate formed is allowed to settle overnight and then collected by centrifugation. The precipitate is dissolved in cold water and is thereupon vacuum dried to remove traces of ethanol. After drying, it is again dissolved in cold water containing $Na_2HPO_4 \cdot 7H_2O$ 17.86 mg./ml., $NaH_2PO_4H_2O$, 9.21 mg./hl., adjusted to pH 7.8, preserved with sodium ethyl mercurithiosalicylate and sterile filtered.

EXAMPLE 2

Example 1 is repeated except that distilled water is used in place of one molar urea. Table I below shows the results of the average of 10 runs as controls versus 10 runs using urea.

*Table I*

| | Avg. percent overall recovery, parts |
|---|---|
| Control (10 fermentor tanks) | 100 |
| Urea extraction (10 fermentor tanks) | 144 |

It will be seen that the use of urea in the procedure outlined in Example 1 results in an average net increase in the recovery of streptokinase-streptodornase of 44%.

We claim:
1. The method of recovering streptokinase-streptodornase from fermentation mashes containing the same which comprises precipitating streptokinase-streptodornase from a fermentation mash containing the same by treatment with a mineral acid, suspending the resulting precipitate in an aqueous solution of urea of from 1 to 5 molarity and to approximately 10% of the volume of the original fermentation liquor, adjusting the pH of the suspension with alkali, centrifuging and discarding the resulting precipitate, and thereafter isolating the streptokinase and streptodornase from the resulting supernatant.

2. The method according to claim 1 in which the supernatant containing the streptokinase-streptodornase is treated with calcium ions and protamine to effect precipitation of impurities, removing the resulting precipitate of impurities, and isolating streptokinase and streptodornase from the resulting superntant by alcoholic precipitation.

3. The method according to claim 2 in which the aqueous suspension containing streptokinase-streptodornase is contacted with three molar urea.

References Cited by the Examiner
UNITED STATES PATENTS 2,677,642   5/54   Ablondi et al. _____ 167—73

OTHER REFERENCES

Boeri et al.: Arch. Biochem. Biophys. 94, 336–341 (1961).

Nelson et al.: Journal of Biological Chemistry, May 1962, pages 1567–1574.

Reichert, Biochem. Biophys. Acta 50, 191–193, 1961.

A. LOUIS MONACELL, *Primary Examiner.*